US012792859B2

(12) United States Patent
Vezzali et al.

(10) Patent No.: US 12,792,859 B2
(45) Date of Patent: Nov. 10, 2026

(54) IMAGE-UPSCALING METHOD AND ASSOCIATED OPTICAL SCANNER

(71) Applicant: Datalogic IP Tech, S.r.l., Bologna (IT)

(72) Inventors: Enrico Vezzali, Vignola (IT); Stefano Santi, Eugene, OR (US)

(73) Assignee: Datalogic IP Tech, S.R.L., Bologna (IT)

( * ) Notice: Subject to any disclaimer, the term of this patent is extended or adjusted under 35 U.S.C. 154(b) by 0 days.

(21) Appl. No.: 19/003,864

(22) Filed: Dec. 27, 2024

(65) Prior Publication Data

US 2026/0187395 A1 Jul. 2, 2026

(51) Int. Cl.

*G06K 7/14* (2006.01)
*G06K 7/10* (2006.01)
*G06T 3/4046* (2024.01)
*G06T 3/4053* (2024.01)

(52) U.S. Cl.

CPC ......... *G06K 7/1482* (2013.01); *G06K 7/1417* (2013.01); *G06K 7/1465* (2013.01); *G06T 3/4046* (2013.01); *G06T 3/4053* (2013.01); *G06K 2007/10524* (2013.01)

(58) Field of Classification Search

CPC .. G06K 7/1482; G06K 7/1417; G06K 7/1465; G06K 2007/10524; G06T 3/4046; G06T 3/4053

See application file for complete search history.

(56) References Cited

U.S. PATENT DOCUMENTS

2024/0062333 A1* 2/2024 Khan ........................ G06T 5/70

OTHER PUBLICATIONS

Badirli, et al., "Gradient Boosting Neural Networks: GrowNet", in 2020.
Lv, et al., "Iterative deep neural networks based on proximal gradient descent for image restoration" published in 2022.
Neshatpour, et al., "ICNN: The Iterative Convolutional Neural Network", published in 2019.
Nix, et al., "Estimating the Mean and Variance of the Target Probability Distribution" 1994 paper.
Pfeil, "ItNet: iterative neural networks with small graphs for accurate, efficient and anytime semantic segmentation" published in 2021.

* cited by examiner

*Primary Examiner* — Matthew Mikels
(74) *Attorney, Agent, or Firm* — Cozen O'Connor

(57) ABSTRACT

A method for upscaling an image includes executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork. The method also includes executing a second subnetwork of the ANN, with pixels of the image patch as input thereto, to yield a second predicted image patch as an output of the second subnetwork, wherein executing the second subnetwork includes concatenating the first vector with the input to a receiving hidden layer of the second subnetwork to yield a concatenated vector. The method also includes determining an upscaled image patch as one of the first predicted image patch and the second predicted image patch.

18 Claims, 6 Drawing Sheets

310

490

IMAGE-UPSCALING METHOD AND ASSOCIATED OPTICAL SCANNER

BACKGROUND

A problem often encountered when implementing artificial neural networks (ANNs) on embedded devices is that such devices have insufficient computational power to implement the neural network. Examples of such an embedded device include symbol readers, such as barcode scanners, in which the reader's decoding rate is limited in part by the resolution of images captured by the device. A symbol reader may include an embedded ANN that upscales the captured image to a higher resolution image, which increases the reader's attainable decoding rate.

SUMMARY OF THE EMBODIMENTS

Embodiments disclosed herein include a method to increase the speed of image-to-image translation algorithms i.e., algorithms that transform an image from one domain to another, where the goal is to learn the mapping between an input image and an output image. In particular, embodiments of this method proved to be useful in solving the task of single-image super-resolution. Other applications of this method may include image denoise and deblur or even a combination of the above.

Embodiments of the method employ an ANN with multiple subnetworks, the execution of which defines a step of the method. In this way, the complete process is divided into multiple steps, each of which reduces the error from the desired solution. The advantage of this is the ability to stop the process before completing all steps when the result is already good enough. This ensures that we do not waste time in computing unnecessary calculations. In addition, this invention can perform a different number of steps for every single input pixel of the image. In this way, the heavy part of the algorithms (implementing more subnetworks) is performed just on the areas of the image that really need these extra computations.

While this embodiment of the method may be applied to increasing image resolution, other embodiments may be implemented to accelerate image-to-image algorithms such as: image denoising, image deblur, artifact removal (e.g., from lossy image compression), and smart morphological filters.

In a first aspect, a method for upscaling an image is disclosed. The method includes executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork. The method also includes executing a second subnetwork of the ANN, with pixels of the image patch as input thereto, to yield a second predicted image patch as an output of the second subnetwork. Executing the second subnetwork includes concatenating the first vector with the input to a receiving hidden layer of the second subnetwork to yield a concatenated vector. The method also includes determining an upscaled image patch as one of the first predicted image patch and the second predicted image patch.

In a second aspect, an optical scanner is disclosed. The optical scanner includes an image sensor and circuitry. The image sensor captures an image. The circuitry is communicatively coupled to the image sensor and upscales the image by executing the method of the first aspect.

DETAILED DESCRIPTION OF THE EMBODIMENTS

Figure 1:
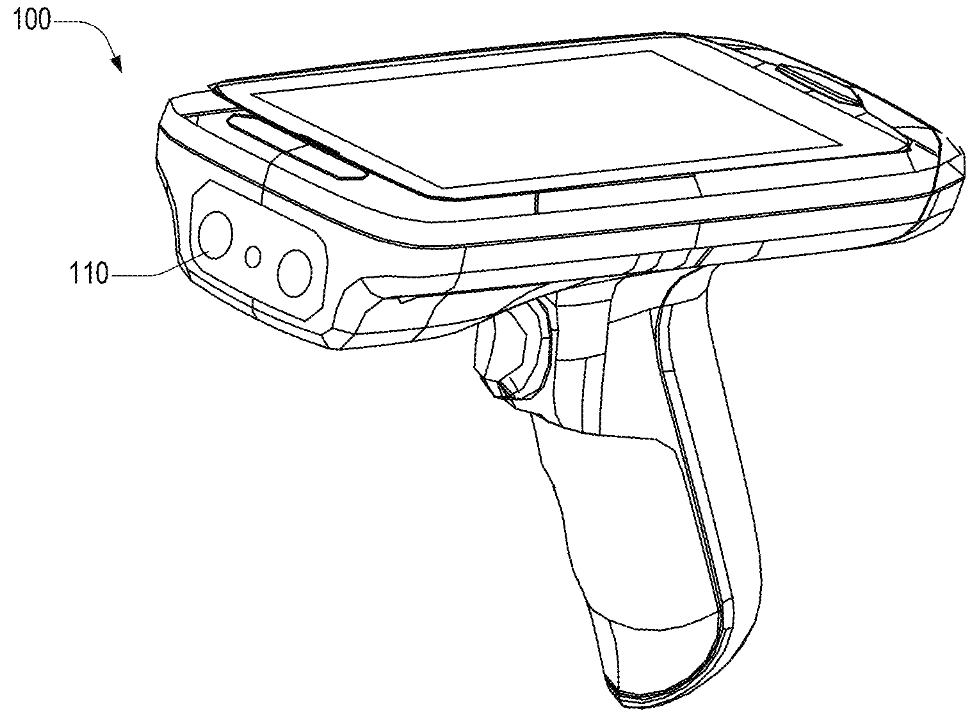
FIG. 1 depicts an embodiment of an optical scanner, which includes a camera.
Figure 2:
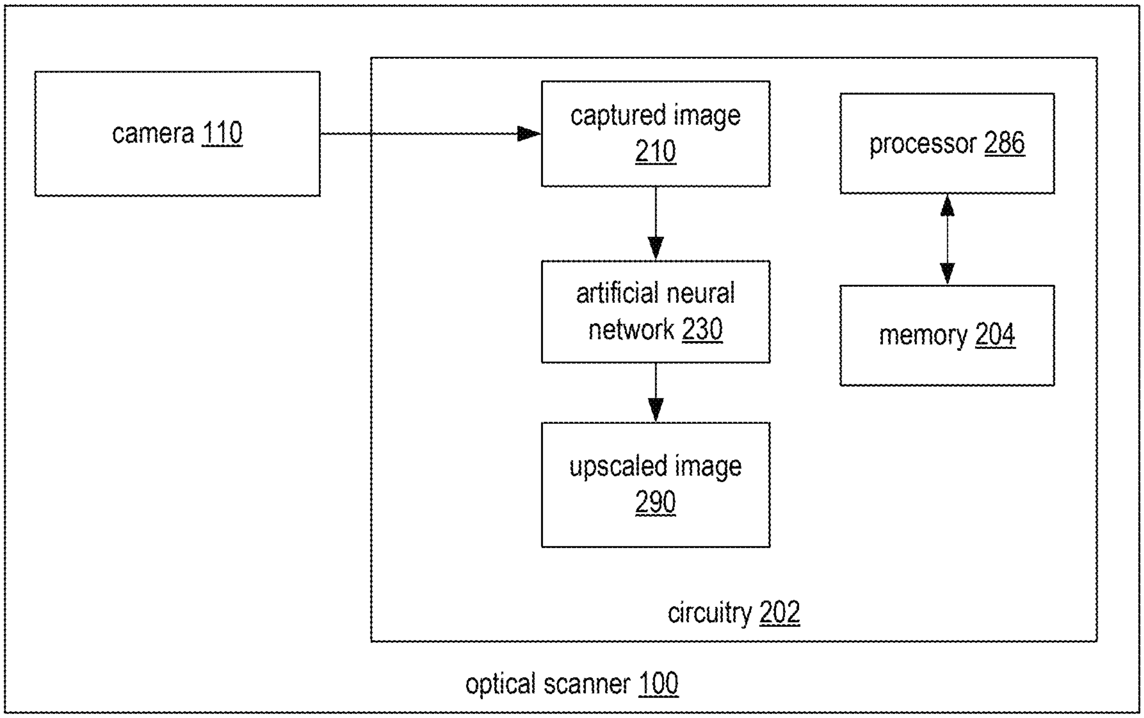
FIG. 2 is a functional block diagram of the optical scanner of FIG. 1, in which the optical scanner used an artificial neural network (ANN) to generate an upscaled image from a captured image.

FIG. 1 depicts an optical scanner 100, which includes a camera 110. FIG. 2 is a functional block diagram of optical scanner 100 showing additional components, which includes circuitry 202 that implements functionality of optical scanner 100. Circuitry 202 may include at least one of a processor 286 and a memory 204. In embodiments, circuitry 202 is, or includes (as processor 286 for example), an integrated circuit, such as an application-specific integrated circuit (ASIC) and a field-programmable gate array (FPGA). Part or all of circuitry 202 may be part of an image sensor of camera 110.

Memory 204 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 204 may be integrated into processor 286. Processor 286 may be, or include, one or more of a CPU and a GPU.

In an example mode of operation, camera 110 captures a captured image 210, which may be stored in a memory of circuitry 202, such as memory 204. Circuitry 202 may include an artificial neural network (ANN) 230 that outputs an upscaled image 290 from a captured image 210. Upscaled image 290 may be stored in memory 204. Captured image 210 may include one or more machine-readable symbols, examples of which include such as a one-dimensional barcode symbol, a two-dimensional machine-readable symbol, a matrix symbol, and a QR code symbol.

Figure 3:
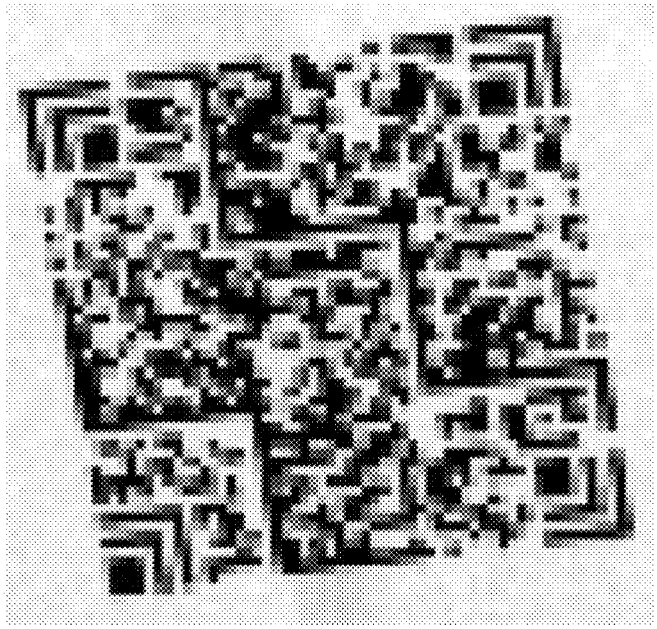
FIGS. 3 and 4 depict a captured image and an upscaled image, which are respective examples of the captured image and upscaled image of FIG. 2.
Figure 4:
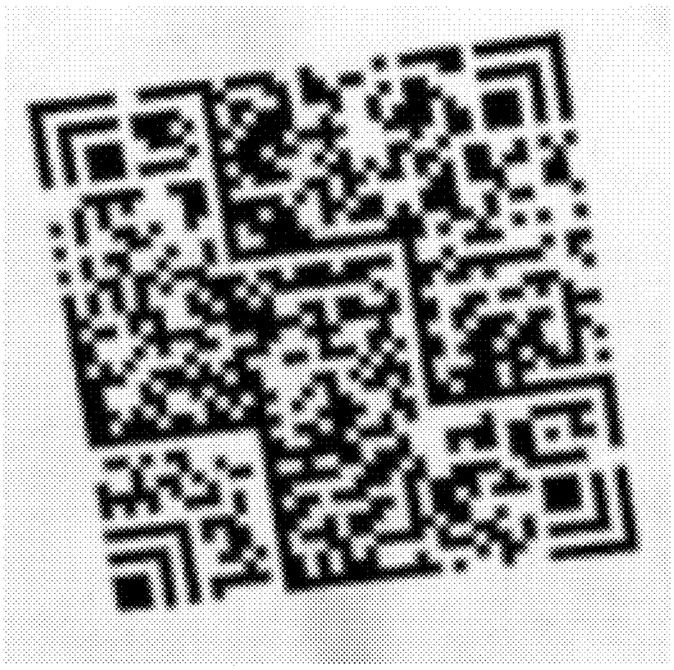

Super-resolution can be seen as a function mapping every pixel of an original image to a group of pixels in an upscaled image. FIGS. 3 and 4 depict a captured image 310 and an upscaled image 490, which are respective examples of captured image 210 and upscaled image 290. The group of pixels may be an $M_1$-by-$M_2$ array, where $M_1$ and $M_2$ are integers. For example, one or both of $M_1$ and $M_2$ may equal two, three, or four. Training of ANN 230 may employ two images, one at high resolution and one downscaled to lower resolution. What we want to find is the function that for every pixel of the low-resolution image generates an upscaled patch of $M_1 \times M_2$ pixels and minimizes the error between the generated patch and the $M_1 \times M_2$ corresponding pixels in the original image at high resolution.

However, to predict the $M_1 \times M_2$ final pixels we need an input of features, and one pixel is not enough. To give more information to the network we select an $N_1$-by-$N_2$ neighborhood of the input pixel and take all the pixel values in that neighborhood as input of ANN 230. The neighborhood may be an array of pixels that includes the input pixel. Each of $N_1$ and $N_2$ is an integer and, in embodiments, at least one of $N_1$ exceeds $M_1$ and $N_2$ exceeds $M_2$. A common input size is between 5×5 and 9×9.

Figure 5:
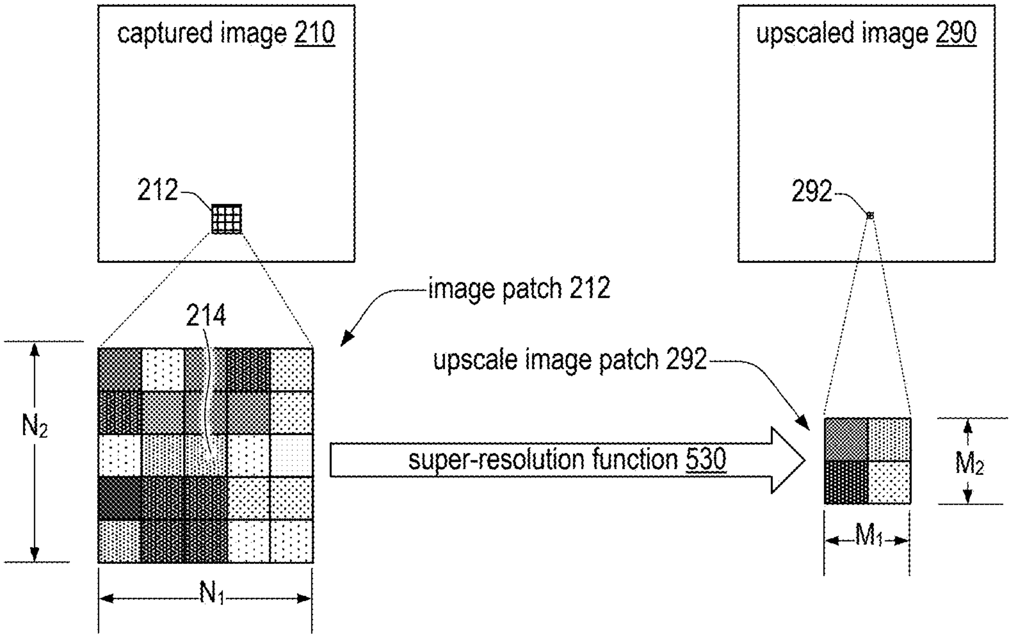
FIG. 5 shows an example mapping, by a super-resolution function, of an image patch of the captured image of FIG. 2 to an upscaled image patch 292 of the upscaled image of FIG. 2.

FIG. 5 shows an example mapping, by a super-resolution function 530, of an image patch 212 of captured image 210 to an upscaled image patch 292 of upscaled image 290. Image patch 212 is a $N_1$-by-$N_2$ array of pixels. Upscaled image patch 292 is an $M_1$-by-$M_2$ array of pixels. In this example $N_1=N_2=5$ and $M_1=M_2=2$. FIG. 5 denotes an input pixel 214 at the center of image patch 212.

Super-resolution function 530 is a non-linear function from the domain $R^{N_1 \times N_2}$ to the codomain $R^{M_1 \times M_2}$. As such, function 530 may can be approximated with a fully convolutional neural network. This mapping process may then be carried out for every pixel of captured image 210. Optimized functions may be used to generate a patch for every input pixel given an image. One of these optimized functions is im2col, and is usually very fast on both CPUs and GPUs. Multiple patches may be concatenated in a batch and fed to ANN 230.

Figure 6:
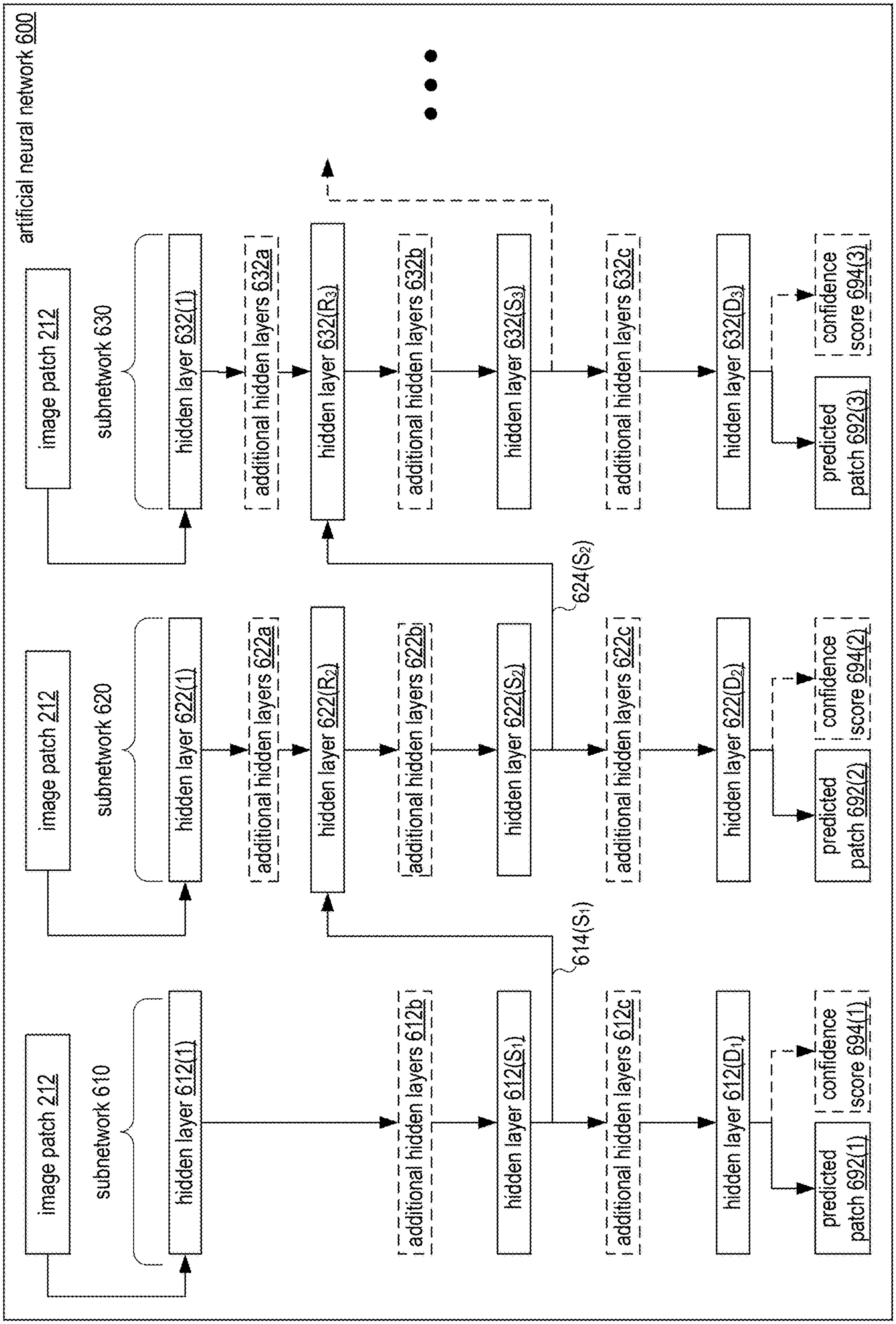
FIG. 6 is a functional block diagram of an artificial neural network which is an embodiment of the ANN of FIG. 2.

FIG. 6 is a functional block diagram of an artificial neural network 600, hereinafter ANN 600, which is an example of ANN 230, FIG. 2. ANN 600 includes subnetworks 610 and 620, each of which is an ANN. ANN 600 may include one or more additional subnetworks, such as subnetwork 630 illustrated in FIG. 6.

In an example mode of operation each subnetwork 610, 620, and 630 receives image patch 212 as an input layer and outputs a respective predicted patch 692(1), 692(2), and 692(3). Each predicted patch is an example of upscaled image patch 292.

In embodiments, at least one of (i) subnetwork 610 outputs a confidence score 694(1) associated with predicted patch 692(1), (ii) subnetwork 620 outputs a confidence score 694(2) associated with predicted patch 692(2), and (iii) subnetwork 630 outputs a confidence score 694(3) associated with predicted patch 692(3). Confidence score 694(*k*) may have inversely related to a standard deviation of pixel values of predicted patch 692(*k*), where example values of index (k) include 1, 2, and 3. That is, in such embodiments, the confidence score increases as the standard deviation decreases. For example, the confidence score may be inversely proportional to the standard deviation.

Subnetworks 610, 620, and 630 includes hidden layers 612, 622, and 632, respectively. $D_1$, $D_2$, and $D_3$ denote that total number of hidden layers 612, 622, and 632, respectively, are the respective depths of subnetworks 610, 620, and 630. Accordingly, subnetwork 610 includes hidden layers 612(1, 2, . . . , $D_1$), subnetwork 620 includes hidden layers 622(1, 2, . . . , $D_2$), and subnetwork 630 includes hidden layers 632(1, 2, . . . , $D_3$). The depths of any two subnetworks 610, 620, and 630 may by the same or different, such that any two of $D_1$, $D_2$, and $D_3$ may be equal or different.

One of hidden layers 612 functions as a source hidden layer, and is denoted in FIG. 6 as hidden layer 612($S_1$), where $S_1$ is a positive integer less than or equal to $D_1$. The function of a source hidden layer is disclosed below in the description of method 700, FIG. 7. One of hidden layers 622 functions as a source hidden layer, and is denoted as hidden layer 622($S_2$), where $S_2$ is a positive integer less than or equal to $D_2$. In embodiments, one of hidden layers 632 functions as a source hidden layer, and is denoted as hidden layer 632($S_3$), where $S_3$ is a positive integer less than or equal to $D_3$.

One of hidden layers 622 functions as a receiving hidden layer, and is denoted as hidden layer 622($R_2$), where $R_2$ is a positive integer less than or equal to $D_2$. In embodiments, one of hidden layers 632 functions as a receiving hidden layer, and is denoted as hidden layer 632($R_3$), where $R_3$ is a positive integer less than or equal to $D_3$. The function of a receiving hidden layer is disclosed below in the description of method 700, FIG. 7. In embodiments, at least one of $1<R_2<D_2$ and $1<R_3<D_3$.

Subnetwork 610 may include at least one of (i) one or more additional hidden layers 612*b* between hidden layer 612(1) and hidden layer 612($S_1$) and (ii) one or more additional hidden layers 612*c* between hidden layer 612($S_1$) and hidden layer 612($D_1$). Subnetwork 620 may include at least one of (i) one or more additional hidden layers 622*a* between hidden layer 622(1) and hidden layer 622($R_2$), (ii) one or more additional hidden layers 622*b* between hidden layer 622($R_2$) and hidden layer 622($S_2$), and (iii) one or more additional hidden layers 622*c* between hidden layer 622($S_2$) and hidden layer 622 ($D_2$). Subnetwork 630 may include at least one of (i) one or more additional hidden layers 632*a* between hidden layer 632(1) and hidden layer 632($R_3$), (ii) one or more additional hidden layers 632*b* between hidden layer 632($R_3$) and hidden layer 632($S_3$), and (iii) one or more additional hidden layers 632*c* between hidden layer 622($S_3$) and hidden layer 632($D_3$).

The depth of a source hidden layer of a subnetwork of ANN 600 may exceed the depth of the receiving layer of the next subnetwork of ANN 600. For example, at least one of the following equalities may apply to ANN 600: $S_1$ exceeds $R_2$, $S_2$ exceeds $R_3$, $S_1/D_1$ exceeds $R_2/D_2$, and $S_2/D_2$ exceeds $R_3/D_3$. For example, the quotient $S_1/D_1$ may exceed a value Q and quotient $R_2/D_2$ may be less than (1−Q), where Q is positive and less than one. Example values of Q include 0.5, 0.6, ⅔, 0.7, ¾, 0.8, and 0.9.

In embodiments, the source hidden layer of a subnetwork of ANN 600 may be the penultimate layer of the subnetwork. For example, at least one of $S_1=D_1-1$, $S_2=D_2-1$, and $S_3=D_3-1$. In embodiments, the receiving hidden layer of a subnetwork of ANN 600 may be the second hidden layer of the subnetwork. For example, at least one of $R^2$ and $R_3$ may equal two.

Figure 7:
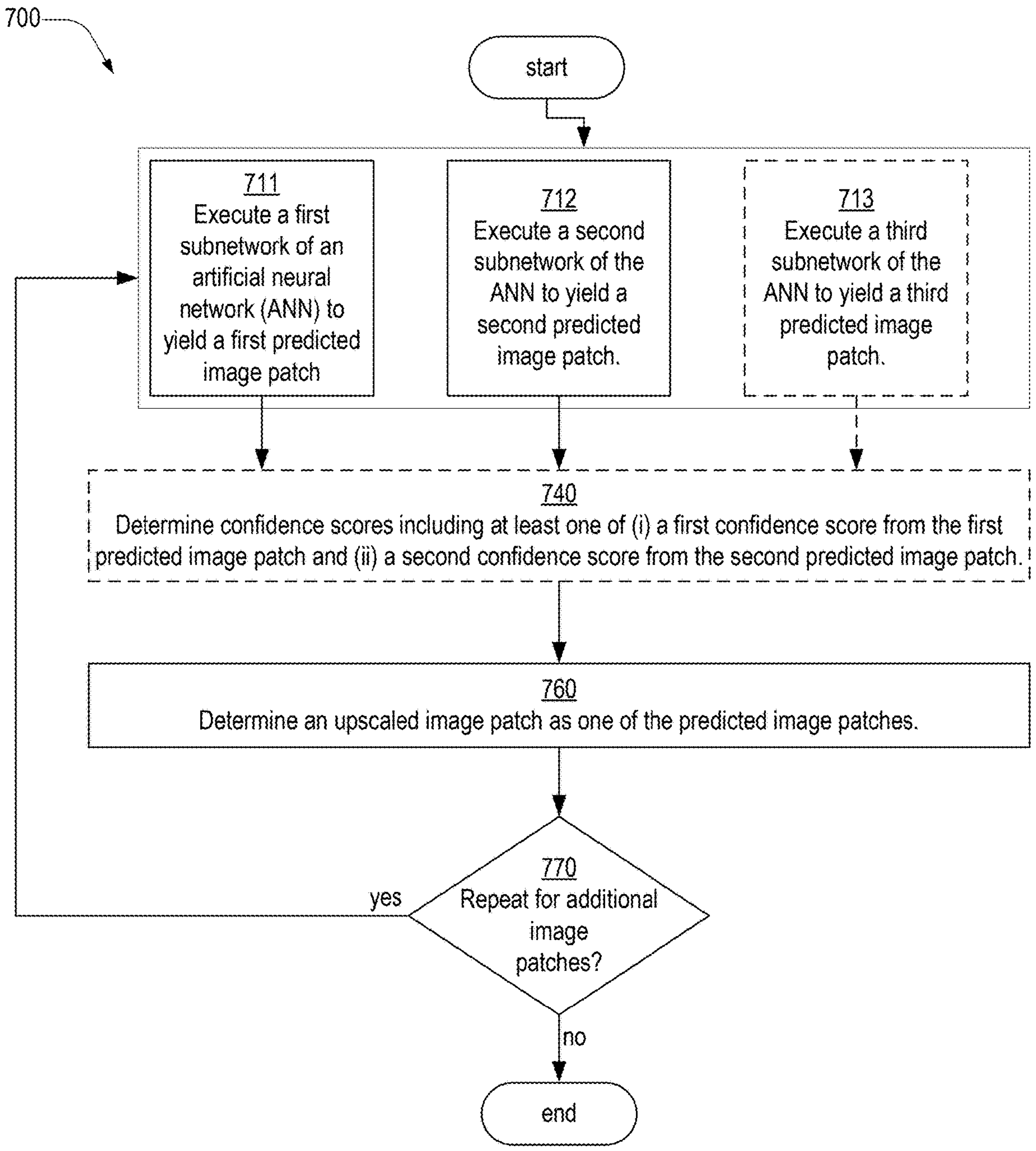
FIG. 7 is a flowchart illustrating an embodiment of a method for upscaling an image, which may be implemented by the optical scanner of FIGS. 1 and 2.

FIG. 7 is a flowchart illustrating a method 700 for upscaling an image. In embodiments, method 700 is implemented within one or more aspects of optical scanner 100. For example, method 700 may be implemented by circuitry 202, which may execute ANN 600. In embodiments, method 700 is implemented by processor 286 executing computer-readable instructions of software stored in memory 204. Method 700 includes at least one of steps 711, 712, 713, 740, 760, and 770.

The following description of method 700 includes parenthetical numbers following terms recited by the method. The parenthetical number indicates that the element associated with the number in parenthesis is an example of the term. For example, the description of step 711 below recites "executing a first subnetwork (610)," which means that subnetworks 610 of ANN 600, FIG. 6, is an example of the first subnetwork introduced in step 711.

Step 711 includes executing a first subnetwork (610) of an artificial neural network (ANN, 600), with pixels of an image patch 212 of the image (210) as an input layer thereto, to yield (i) a first predicted image patch (692(1)) as an output layer of the first subnetwork and (ii) a first vector (614($S_1$)) output by a source hidden layer (612($S_1$)) of the first subnetwork Step 712 includes executing a second subnetwork (620) of the ANN, with pixels of the image patch as input thereto, to yield a second predicted image patch (692(2)) as an output of the second subnetwork, wherein executing the second subnetwork includes concatenating the first vector with the input to a receiving hidden layer (622($R_2$)) of the second subnetwork to yield a concatenated vector. Since the receiving hidden layer (622($R_2$)) receives both the first vector (614($S_1$)) and an output vector from the previous hidden layer (622($R_2$−1)), the number of nodes of the receiving layer may exceed the number of nodes of the previous hidden layer and/or the subsequent hidden layer of the subnetwork (620).

In embodiments, step 712 yields a second vector (624 ($S_2$)) output by a second source hidden layer (622($S_2$)) of the second subnetwork. Step 713 includes executing a third subnetwork (630) of the ANN, with pixels of the image patch as input thereto, to yield a third predicted image patch (692(3)) as an output of the third subnetwork, wherein executing the third subnetwork includes concatenating the second vector with the input to a third receiving hidden layer (632($R_3$)) of the third subnetwork to yield a second concatenated vector. Since the third receiving hidden layer (632 ($R_3$)) receives both the second vector (624($S_2$)) and an output vector from the previous hidden layer (632($R_3$−1)), the number of nodes of the third receiving layer may exceed the number of nodes of the previous hidden layer and/or the subsequent hidden layer of the subnetwork (630).

Step 760 includes determining an upscaled image patch (292) as one of the first predicted image patch and the second predicted image patch. When method 700 includes step 713, step 760 may include determining the upscaled image patch as one of the first predicted image patch, the second predicted image patch, and the third predicted image patch.

Method 700 may include step 740, which includes determining confidence scores, which include at least one of (i) a first confidence score (694(1)) from the first predicted image patch and (ii) a second confidence score (694(2)) from the second predicted image patch. In such embodiments, method 700 may execute step 713 only when one or both of the first confidence score and the second confidence score exceed a predefined threshold. When method 700 includes step 713, the confidence scores may include a third confidence score (694(3)) from the third predicted image patch. When method 700 includes step 740, determining the upscaled image patch (step 760) may include determining the upscaled image patch as the image patch of the first image patch, the second image patch, and (in embodiments) the third image patch, having the highest confidence score.

Method 700 may be repeated for additional image patches of the captured image (210). Step 770 is a decision. When the image includes an additional image patch, method 700 repeats to generate an additional upscaled image patch from the additional image patch. An advantage of method 700 is that a different number of subnetworks may be used when generating an upscaled image patch from each image patch of captured image 210. In example execution of method 700, determining an upscaled image patch 292 from a first image patch 212 may require determining each of predicted image patches 692(1), 692(2), and 692(3), as confidence scores 694(1) and 694(2) are too low, while only confidence score 694(3) is sufficiently high. Yet, executing method 700 for a second image patch 212 may require determining only predicted image patches 692(1) and 692(2) because, for example, confidence score 694(2) may be sufficiently high such that executing subnetwork 630 is not necessary.

In a captured image 210, there may be regions of the image where the standard deviation is small (high confidence score 694) even at the beginning and other regions that are more difficult to compute (lower confidence score 694)) and require more steps. Since embodiments of method 700 compute a confidence score 694 for every input pixel 214 for each subnetwork (610, 620, . . . ) executed, method 700 may appropriately adjust the number of subnetworks used for every input pixel 214.

Figure 8:
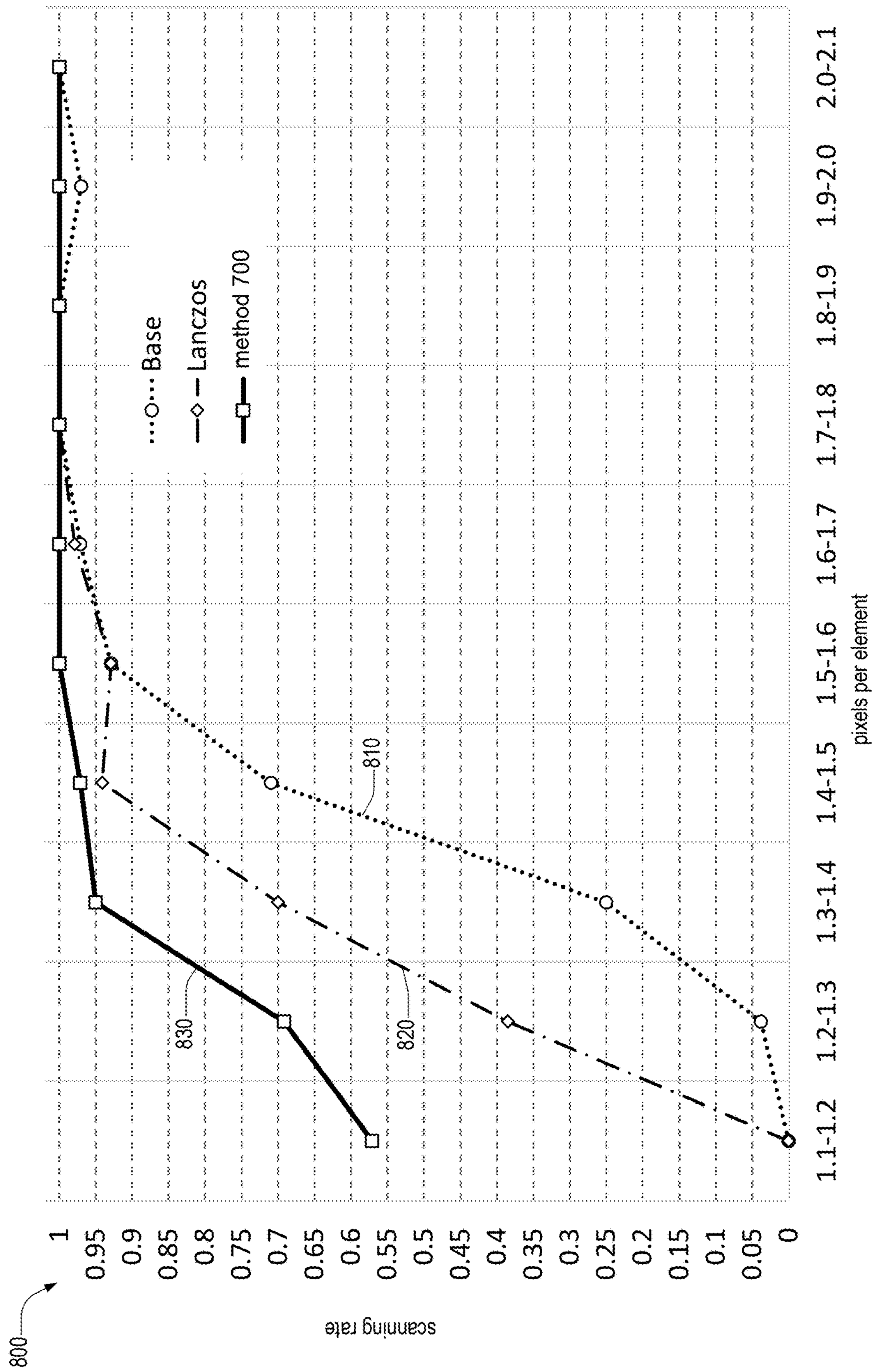
FIG. 8 is a plot of normalized scanning rates as a function of pixels per element.

FIG. 8 is a plot 800 of normalized scanning rates as a function of pixels per element. Plot 800 includes curves 810, 820, and 830. Curve 810 is a baseline rate with no upscaling. Curve 820 results from implementing an optimized Lanczos filter. Curve 830 corresponds to an embodiment of optical scanner 100 implementing method 700, in which the scanning rate at low-resolution images exceeds that of curves 810 and 820.

COMBINATIONS OF FEATURES

Features described above, as well as those claimed below, may be combined in various ways without departing from the scope hereof. The following enumerated examples illustrate some possible, non-limiting combinations.

Embodiment 1. A method for upscaling an imager includes executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork. The method also includes executing a second subnetwork of the ANN, with pixels of the image patch as input thereto, to yield a second predicted image patch as an output of the second subnetwork. Executing the second subnetwork includes concatenating the first vector with the input to a receiving hidden layer of the second subnetwork to yield a concatenated vector. The method also includes determining an upscaled image patch as one of the first predicted image patch and the second predicted image patch.

Embodiment 2. The method of embodiment 1, the source hidden layer being the penultimate hidden layer of the first subnetwork; and the receiving hidden layer being the second hidden layer of the second subnetwork.

Embodiment 3. The method of either one of embodiments 1 or 2, the source hidden layer being layer $S_1$ of $D_1$ total hidden layers of the first subnetwork where the $$D_1^{th}$$

hidden layer is the final hidden layer of the first subnetwork; and the receiving hidden layer being layer $R_2$ of $D_2$ total hidden layers of the second subnetwork where $$D_2^{th}$$

hidden layer is the final hidden layer of the second subnetwork; wherein the quotient $S_1/D_1$ exceeds the quotient $R_2/D_2$.

Embodiment 4. The method of embodiment 3, the quotient $S_1/D_1$ exceeding one half and quotient $R_2/D_2$ being less than one half.

Embodiment 5. The method of embodiment 3, the quotient $S_1/D_1$ exceeding two-thirds half and quotient $R_2/D_2$ being less than one-third.

Embodiment 6. The method of any one of embodiments 1-5, the image patch being an $N_1 \times N_2$ array of input pixels of an input images, the predicted patch being an $M_1 \times M_2$ array of output pixels, where $N_1$ exceeds $M_1$ and $N_2$ exceeds $M_2$.

Embodiment 7. The method of any one of embodiments 1-6, executing the second subnetwork yielding a second vector output by a second source hidden layer of the second subnetwork, and further including: determining confidence scores including at least one of (i) a first confidence score from the first predicted image patch and (ii) a second confidence score from the second predicted image patch; and when none of the confidence scores exceed a predefined threshold: executing a third subnetwork of the ANN, with pixels of the image patch as input thereto, to yield a third predicted image patch as an output of the third subnetwork, wherein executing the third subnetwork includes concatenating the second vector with the input to a third receiving hidden layer of the third subnetwork to yield a second concatenated vector; wherein said determining includes determining the upscaled image patch as one of the first predicted image patch, the second predicted image patch, and the third predicted image patch.

Embodiment 8. The method of any one of embodiments 1-7, further including: determining a first confidence score from the first predicted image patch and a second confidence score from the second predicted image patch; wherein, in said determining the upscaled image patch, the upscaled image patch being the image patch, of the first and the second image patches, having the highest confidence score. Determining the first and the second confidence scores may include determining (i) a first standard deviation of pixel values of the first predicted image patch and (ii) a second standard deviation of pixel values of the second predicted image patch. The first and the second confidence scores are inversely proportional to the first and the second standard deviations, respectively.

Embodiment 9. The method of any one of embodiments 1-8, executing the second subnetwork yielding a second vector output by a second source hidden layer of the second subnetwork, and further including: executing a third subnetwork of the ANN, with pixels of the image patch as input thereto, to yield a third predicted image patch as an output of the third subnetwork, wherein executing the third subnetwork includes concatenating the second vector with the input to a third receiving hidden layer of the third subnetwork to yield a second concatenated vector; wherein said determining includes determining the upscaled image patch as one of the first predicted image patch, the second predicted image patch, and the third predicted image patch.

Embodiment 10. The method of any one of embodiments 1-9, further including: determining, for each of the first, the second, and the third predicted image patches, a respective one of a plurality of confidence scores; wherein, in said determining the upscaled image patch, the upscaled image patch being the image patch, of the first, the second, and the third image patches, having the highest confidence score.

Embodiment 11. The method of embodiment 10, in which the plurality of confidences scores includes a first, a second, and a third confidence score of the first, the second, and the third predicted image patch, respectively. In embodiment 11, determining the plurality of confidence scores includes determining: (i) a first standard deviation of pixel values of the first predicted image patch, (ii) a second standard deviation of pixel values of the second predicted image patch, and (iii) a third standard deviation of pixel values of the predicted image patch, The first, the second, and the third confidence scores are inversely proportional to the first, the second, and third standard deviations, respectively.

Embodiment 12. The method of any one of embodiments 1-11, further including: repeating, for an additional image patch of the image, said executing the first subnetwork to yield a first additional predicted image patch and a first additional vector output; repeating, for the additional image patch, said executing the second subnetwork to yield a second additional predicted image patch; and determining an additional upscaled image patch as one of the first additional predicted image patch and the second additional predicted image patch.

Embodiment 13. The method of embodiment 12, repeating said executing the second subnetwork yielding a second additional vector output by the second hidden layer of the second subnetwork, and further including: determining additional confidence scores including at least one of (i) a first confidence score from the first additional predicted image patch and (ii) a second confidence score from the second additional predicted image patch; and when none of the additional confidence scores exceed a predefined threshold: executing a third subnetwork of the ANN, with pixels of the image patch as input thereto, to yield a third predicted image patch as an output of the third subnetwork, wherein executing the third subnetwork includes concatenating the second additional vector with the output of a third receiving hidden layer of the third subnetwork to yield a concatenated vector; and determining a third confidence score from the third predicted patch; wherein, in said determining the additional upscaled image patch, the additional upscaled image patch being the predicted image patch, of the first, the second, and the third additional image patches, having the highest confidence score.

Embodiment 14. An optical scanner includes an image sensor that captures an image; circuitry, communicatively coupled to the image sensor, that upscales the image by executing the method of any one of embodiments 1-13.

Embodiment 15. The optical scanner of embodiment 14, the circuitry including: a processor; and a memory storing machine-readable instructions that, when executed by the processor, executes the method any one of embodiments 1-13.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

Regarding instances of the terms "and/or" and "at least one of," for example, in the cases of "A and/or B," "at least one of A and B," and "at least one of A or B," such phrasing encompasses the selection of (i) A only, or (ii) B only, or (iii) both A and B. In the cases of "A, B, and/or C," "at least one of A, B, and C," and "at least one of A, B, or C," such phrasing encompasses the selection of (i) A only, or (ii) B only, or (iii) C only, or (iv) A and B only, or (v) A and C only, or (vi) Band C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

We claim:

1. A method for upscaling an image, comprising:

executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork;

executing a second subnetwork of the ANN, with pixels of the image patch as input thereto, to yield a second predicted image patch as an output of the second subnetwork, wherein executing the second subnetwork includes concatenating the first vector with the input to a receiving hidden layer of the second subnetwork to yield a concatenated vector;

determining a first confidence score from the first predicted image patch and a second confidence score from the second predicted image patch; and determining an upscaled image patch as one of the first predicted image patch and the second predicted image patch, wherein, in said determining the upscaled image patch, the upscaled image patch being the image patch, of the first and the second image patches, having a highest confidence score.

2. The method of claim 1, the source hidden layer being a penultimate hidden layer of the first subnetwork; and the receiving hidden layer being the second hidden layer of the second subnetwork.

3. The method of claim 1, the source hidden layer being layer $S_1$ of $D_1$ total hidden layers of the first subnetwork where the $$D_1^{th}$$

hidden layer is a final hidden layer of the first subnetwork; and the receiving hidden layer being layer $R_2$ of $D_2$ total hidden layers of the second subnetwork where $$D_2^{th}$$

hidden layer is the final hidden layer of the second subnetwork;

wherein the quotient $S_1/D_1$ exceeds the quotient $R_2/D_2$.

4. The method of claim 3, the quotient $S_1/D_1$ exceeding one half and quotient $R_2/D_2$ being less than one half.

5. The method of claim 3, the quotient $S_1/D_1$ exceeding two-thirds half and quotient $R_2/D_2$ being less than one-third.

6. A method for upscaling an image, comprising:

executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork;

executing a second subnetwork of the ANN, with pixels of the image patch as input thereto, to yield a second predicted image patch as an output of the second subnetwork, wherein executing the second subnetwork includes concatenating the first vector with the input to a receiving hidden layer of the second subnetwork to yield a concatenated vector; and determining an upscaled image patch as one of the first predicted image patch and the second predicted image patch, the image patch being an $N_1 \times N_2$ array of input pixels of an input images, the predicted patch being an $M_1 \times M_2$ array of output pixels, where $N_1$ exceeds $M_1$ and $N_2$ exceeds $M_2$.

7. A method of upscaling an image, comprising:

executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork;

executing a second subnetwork of the ANN, with pixels of the image patch as input thereto, to yield a second predicted image patch as an output of the second subnetwork, wherein executing the second subnetwork includes concatenating the first vector with the input to a receiving hidden layer of the second subnetwork to yield a concatenated vector, wherein executing the second subnetwork yields a second vector output by a second source hidden layer of the second subnetwork;

determining an upscaled image patch as one of the first predicted image patch and the second predicted image patch;

determining confidence scores including at least one of (i) a first confidence score from the first predicted image patch and (ii) a second confidence score from the second predicted image patch; and when none of the confidence scores exceed a predefined threshold:

executing a third subnetwork of the ANN, with pixels of the image patch as input thereto, to yield a third predicted image patch as an output of the third subnetwork, wherein executing the third subnetwork includes concatenating the second vector with the input to a third receiving hidden layer of the third subnetwork to yield a second concatenated vector;

wherein said determining includes determining the upscaled image patch as one of the first predicted image patch, the second predicted image patch, and the third predicted image patch.

8. The method of claim 1, determining the first and the second confidence scores comprising:

determining (i) a first standard deviation of pixel values of the first predicted image patch and (ii) a second standard deviation of pixel values of the second predicted image patch, the first and the second confidence scores being inversely proportional to the first and the second standard deviations, respectively.

9. A method of upscaling an image, comprising:

executing a first subnetwork of an artificial neural network (ANN), with pixels of an image patch of the image as an input layer thereto, to yield (i) a first predicted image patch as an output layer of the first subnetwork and (ii) a first vector output by a source hidden layer of the first subnetwork;

executing a second subnetwork of the ANN, with pixels of the image patch as input thereto, to yield a second predicted image patch as an output of the second subnetwork, wherein executing the second subnetwork includes concatenating the first vector with the input to a receiving hidden layer of the second subnetwork to yield a concatenated vector, wherein executing the second subnetwork yields a second vector output by a second source hidden layer of the second subnetwork;

executing a third subnetwork of the ANN, with pixels of the image patch as input thereto, to yield a third predicted image patch as an output of the third subnetwork, wherein executing the third subnetwork includes concatenating the second vector with the input to a third receiving hidden layer of the third subnetwork to yield a second concatenated vector;

determining an upscaled image patch as one of the first predicted image patch, the second predicted image patch, and the third predicted image patch.

10. The method of claim 9, further comprising:

determining, for each of the first, the second, and the third predicted image patches, a respective one of a plurality of confidence scores;

wherein, in said determining the upscaled image patch, the upscaled image patch being the image patch, of the first, the second, and the third image patches, having a highest confidence score.

11. The method of claim 10, the plurality of confidences scores including a first, a second, and a third confidence score of the first, the second, and the third predicted image patch, respectively, wherein:

determining the plurality of confidence scores including determining (i) a first standard deviation of pixel values of the first predicted image patch, (ii) a second standard deviation of pixel values of the second predicted image patch, and (iii) a third standard deviation of pixel values of the predicted image patch, the first, the second, and the third confidence scores being inversely proportional to the first, the second, and third standard deviations, respectively.

12. The method of claim 1, further comprising:

repeating, for an additional image patch of the image, said executing the first subnetwork to yield a first additional predicted image patch and a first additional vector output;

repeating, for the additional image patch, said executing the second subnetwork to yield a second additional predicted image patch; and determining an additional upscaled image patch as one of the first additional predicted image patch and the second additional predicted image patch.

13. The method of claim 12, repeating said executing the second subnetwork yielding a second additional vector output by the second hidden layer of the second subnetwork, and further comprising:

determining additional confidence scores including at least one of (i) a first confidence score from the first additional predicted image patch and (ii) a second confidence score from the second additional predicted image patch; and when none of the additional confidence scores exceed a predefined threshold:

executing a third subnetwork of the ANN, with pixels of the image patch as input thereto, to yield a third predicted image patch as an output of the third subnetwork, wherein executing the third subnetwork includes concatenating the second additional vector with the output of a third receiving hidden layer of the third subnetwork to yield a concatenated vector; and determining a third confidence score from the third predicted patch;

wherein, in said determining the additional upscaled image patch, the additional upscaled image patch being the predicted image patch, of the first, the second, and the third additional image patches, having a highest confidence score.

14. An optical scanner comprising:

an image sensor that captures an image;

circuitry, communicatively coupled to the image sensor, that upscales the image by executing the method of claim 1.

15. The optical scanner of claim 14, the circuitry including:

a processor; and a memory storing machine-readable instructions that, when executed by the processor, executes the method of claim 1.

16. An optical scanner comprising:

an image sensor that captures an image;

a processor, and a memory communicatively coupled to the image sensor;

an artificial neural network (ANN) that (i) includes a first subnetwork and a second subnetwork and (ii) is implemented as machine-readable instructions stored in the memory, that, when executed by the processor, upscales the image by:

executing the first subnetwork, with pixels of an image patch of the image as an input layer thereto, to yield (i) a first predicted image patch as an output layer of the first subnetwork and (ii) a first vector output by a source hidden layer of the first subnetwork;

executing the second subnetwork, with pixels of the image patch as input thereto, to yield a second predicted image patch as an output of the second subnetwork, wherein executing the second subnetwork includes concatenating the first vector with the input to a receiving hidden layer of the second subnetwork; and determining an upscaled image patch as one of the first predicted image patch and the second predicted image patch, wherein the processor further upscales the image by determining confidence scores for every input pixel for each subnetwork and adjust a number of subnetworks used for every input pixel in response thereto.

17. An optical scanner comprising:

an image sensor that captures an image;

a processor; and a memory communicatively coupled to the image sensor;

an artificial neural network (ANN) that (i) includes a first subnetwork and a second subnetwork and (ii) is implemented as machine-readable instructions stored in the memory, that, when executed by the processor, upscales the image by:

executing the first subnetwork, with pixels of an image patch of the image as an input layer thereto, to yield (i) a first predicted image patch as an output layer of the first subnetwork and (ii) a first vector output by a source hidden layer of the first subnetwork;

executing the second subnetwork, with pixels of the image patch as input thereto, to yield a second predicted image patch as an output of the second subnetwork, wherein executing the second subnetwork includes concatenating the first vector with the input to a receiving hidden layer of the second subnetwork; and determining an upscaled image patch as one of the first predicted image patch and the second predicted image patch, wherein determining the upscaled image patch includes selecting the first predicted image patch or the second predicted image patch having a highest confidence score associated there-with.

18. An optical scanner comprising:

an image sensor that captures an image;

a processor; and a memory communicatively coupled to the image sensor;

an artificial neural network (ANN) that (i) includes a first subnetwork and a second subnetwork and (ii) is implemented as machine-readable instructions stored in the memory, that, when executed by the processor, upscales the image by:

executing the first subnetwork, with pixels of an image patch of the image as an input layer thereto, to yield (i) a first predicted image patch as an output layer of the first subnetwork and (ii) a first vector output by a source hidden layer of the first subnetwork;

executing the second subnetwork, with pixels of the image patch as input thereto, to yield a second predicted image patch as an output of the second subnetwork, wherein executing the second subnetwork includes concatenating the first vector with the input to a receiving hidden layer of the second subnetwork; and determining an upscaled image patch as one of the first predicted image patch and the second predicted image patch, wherein a depth of the source hidden layer of the first subnetwork exceeds a depth of the receiving layer of the second subnetwork.

* * * * *